United States Patent

Mizuno et al.

(10) Patent No.: US 8,452,505 B2
(45) Date of Patent: May 28, 2013

(54) NOTIFICATION APPARATUS

(75) Inventors: Yuusuke Mizuno, Kariya (JP); Kazunao Yamada, Toyota (JP); Tadashi Sakai, Obu (JP)

(73) Assignee: Denso Corporation, Kariya (JP)

( * ) Notice: Subject to any disclaimer, the term of this patent is extended or adjusted under 35 U.S.C. 154(b) by 615 days.

(21) Appl. No.: 12/660,277

(22) Filed: Feb. 24, 2010

(65) Prior Publication Data

US 2010/0228459 A1    Sep. 9, 2010

(30) Foreign Application Priority Data

Mar. 4, 2009  (JP) ................................. 2009-050781

(51) Int. Cl.
*G06F 7/70*     (2006.01)
*G06F 19/00*    (2011.01)
*G06F 7/00*     (2006.01)
*G06G 7/76*     (2006.01)

(52) U.S. Cl.
USPC .................. 701/70; 701/1; 701/22; 180/65.1; 180/65.21

(58) Field of Classification Search
USPC .................... 701/70, 22, 54; 180/65.21, 65.1, 180/65.3, 65.4, 65.5, 96.5, 69.6
See application file for complete search history.

(56) References Cited

U.S. PATENT DOCUMENTS

| | | | |
|---|---|---|---|
| 5,378,053 A * | 1/1995 | Patient et al. ........................ 303/3 |
| 5,910,722 A * | 6/1999 | Lyons et al. ................... 320/104 |
| 6,231,134 B1 * | 5/2001 | Fukasawa et al. ............ 303/152 |
| 7,925,426 B2 * | 4/2011 | Koebler et al. ................ 701/123 |
| 7,940,016 B2 * | 5/2011 | Donnelly et al. ............. 318/139 |
| 8,050,810 B2 * | 11/2011 | Egoshi ............................. 701/22 |
| 8,073,616 B2 * | 12/2011 | Yamada ......................... 701/540 |
| 2001/0004029 A1 * | 6/2001 | Wakashiro et al. ........... 180/170 |
| 2009/0063000 A1 * | 3/2009 | Kodama et al. .................. 701/75 |
| 2011/0137535 A1 * | 6/2011 | Goto et al. ....................... 701/70 |

FOREIGN PATENT DOCUMENTS

| | | |
|---|---|---|
| JP | 07-117558 | 5/1995 |
| JP | 2000-247162 | 9/2000 |
| JP | 2002-274219 | 9/2002 |
| JP | 2004-251786 | * 9/2004 |
| JP | 2006-258656 | 9/2006 |
| JP | 2007-221889 | 8/2007 |
| JP | 2007-312581 | 11/2007 |
| JP | 2009-38895 | 2/2009 |

OTHER PUBLICATIONS

Machine Translated English of JP 2004-251786 (PDF file jp2004251786_US_trans.pdf).*

* cited by examiner

*Primary Examiner* — Khoi Tran
*Assistant Examiner* — Rachid Bendidi
(74) *Attorney, Agent, or Firm* — Harness, Dickey & Pierce, PLC

(57) ABSTRACT

A re-generation instruction apparatus has a re-generation instruction computer that receives brake operation information from a re-generation control computer for calculating an energy loss in a total energy from speed reduction by the brake operation of the driver, which is lost by a re-generation brake system. The calculated energy loss is utilized for preparing notification for the driver in various situations such as a pre-travel notification, a during-travel notification and/or an after-travel notification.

15 Claims, 9 Drawing Sheets

FIG. 2

| NO | SEC1 | SEC2 | SEC3 | SEC4 | SEC5 |
|---|---|---|---|---|---|
| 1 | 0 | 1 | 1 | 0 | 0 |
| 2 | 0 | 1 | 0 | 0 | 0 |
| 3 | 1 | 0 | 1 | 1 | 0 |
| 4 | 1 | 1 | 1 | 0 | 0 |
| 5 | 0 | 1 | 0 | 0 | 0 |
| 6 | 0 | 0 | 1 | 1 | 0 |
| 7 | 0 | 1 | 1 | 0 | 0 |
| 8 | 0 | 0 | 0 | 0 | 0 |
| DATA | 00110000 | 11011010 | 10110110 | 00100100 | 00000000 |

0 : NO LOSS
1 : LOSS

NOTIFICATION APPARATUS

CROSS REFERENCE TO RELATED APPLICATION

The present application is based on and claims the benefit of priority of Japanese Patent Application No. 2009-50781, filed on Mar. 4, 2009, the disclosure of which is incorporated herein by reference.

FIELD OF THE INVENTION

The present disclosure generally relates to a vehicle notification apparatus which notifies a driver of information about the loss and gain of the energy in a re-generation brake system used in a vehicle.

BACKGROUND INFORMATION

In recent years, re-generation brake systems are used in vehicles such as a hybrid vehicle, an electric vehicle or the like that are equipped with a secondary battery. The re-generation brake systems regenerate electricity by using a motor which is usually employed for driving the vehicle. That is, in the re-generation brake system, the kinetic energy of the vehicle movement is collected as the generated electricity, and the electricity generation load is used for braking, i.e., for reducing the vehicle speed. The re-generation brake system for use in a vehicle charges a battery in the vehicle by the generated electricity, for the purpose of saving the energy. Therefore, a vehicle equipped with the re-generation brake system has an improved fuel mileage, in comparison to a vehicle with the mechanical brake only, by collecting the kinetic energy and reusing the collected energy.

However, the vehicular re-generation brake system has an upper limit of the regeneratable power (designated as the maximum re-generated power in the following description) due to the capacity of various parts such as the battery, charging device and the like in the vehicle. Therefore, if the generated electricity (i.e., the electric power, or the generated energy) by the motor exceeds the upper limit, the exceeding portion of the generated energy is converted to heat to be dissipated. That is, the exceeding portion of the generated energy is lost and cannot be collected as the electric energy.

In addition, the motor used in the re-generation braking has a peak generated electricity at a certain rotation speed, i.e., a maximum brake force exerted at that peak. Thus, the braking force from the re-generation braking has a certain upper limit. Therefore, the re-generation brake system in a vehicle is usually combined with a mechanical brake system that uses friction for braking.

As a result, the braking operation by the driver demanding a hard braking leads to the simultaneous operation of the re-generation braking and the mechanical braking. In that case, the mechanical braking dissipates the kinetic energy from speed reduction as heat from friction, thereby making it impossible to collect it as the electric energy.

In other words, the energy loss in the braking leads to the decrease in energy efficiency due to the energy loss that cannot be collected as electricity when the generated electricity of the motor exceeds the maximum re-generation power, or when the brake operation demands the braking force that exceeds the upper limit of the motor generated electricity.

On the other hand, as disclosed in a Japanese patent document 1, JP-A-2007-221889, a technique for improving energy efficiency of re-generation braking is known. In the vehicle driving support apparatus of the patent document 1, map information on speed reduction required points is extracted from a map database, and a target speed for a speed reduction point is set based on the extracted map information, and a required distance for reducing the current speed to the target speed by using the re-generation brake only is calculated. Then, a start timing of the brake operation is advised when the vehicle approaches a required distance from the speed reduction required point. In this manner, the driver can perform an efficient brake operation that causes only the re-generation braking for reducing the vehicle speed.

However, the technique in the patent document 1 has the following problem.

That is, guidance for re-generation braking can only be provided for the pre-defined points that are recorded as the map information, such as a stop sign, an intersection or the like. That is, guidance for the other points will not be provided, thereby not enabling the driver to perform the efficient brake operation at the other points. Further, the required distance for the braking prior to the stop sign or the intersection may be different driver to driver, depending on the driving habit. Therefore, the driving habits of the respective drivers must be considered for the guidance of re-generation braking, for further improving the energy efficiency.

Furthermore, the above technique can only provide the braking guidance in a feed-forward manner, which provides the guidance prior to the braking, without the evaluation of the actual braking performed under the provided guidance. Thus, training effects for the driver to perform an efficient brake operation based on the feedback of the actual braking will not be expected, and energy efficiency improvement effects on the re-generation braking can not be expected.

Furthermore, braking guidance is provided at the pre-defined points based only on the map information without taking the driving habit of the driver into consideration. Therefore, the driver will have redundant and/or annoying braking guidance for a specific point where he/she always minds for not losing an efficient re-generation braking timing, if the specific point is one of the pre-defined points.

SUMMARY OF THE INVENTION

In view of the above and other problems, the present disclosure provides a technique that effectively notifies the driver of efficiency information on re-generation braking.

In an aspect of the present disclosure, a notification apparatus for use in a vehicle having a re-generation brake system that (a) uses electricity generation load of a motor as a braking force to a tire of a vehicle and (b) collects regenerated electric energy to a vehicle battery includes: a notification unit for notifying a driver of information; a loss calculation unit for calculating loss information regarding energy loss that is defined as difference between decrease of kinetic energy due to braking by the driver and re-generation by the re-generation brake in the course of braking; and a control unit for (a) generating energy information regarding the energy loss and (b) controlling notification of the energy information for the driver by the notification unit based on the loss information calculated by the loss calculation unit. In this case, the loss information means an amount of the lost energy that is not collected by the re-generation brake, whether or not the energy loss has been caused, the physical quantity countable as the energy loss (e.g., the torque of the mechanical brake used in combination with the re-generation brake, the difference between the total brake power and the maximum regenerated power) or the like. That is, various indices may be employed as the loss information.

In addition, by notifying the driver of the loss information about the actual loss of energy caused by the brake operation by the driver, the driver has a feedback from the actual braking operation, thereby correcting the braking operation by him/herself based on a recognition that his/her, braking habit caused the energy loss. Thus, the notification apparatus in the present disclosure forms a feedback loop for training the driver to recognize his/her driving habit and to perform an efficient brake operation.

BRIEF DESCRIPTION OF THE DRAWINGS

Objects, features, and advantages of the present disclosure will become more apparent from the following detailed description made with reference to the accompanying drawings, in which:

FIG. 2 is an illustration showing an example of learning data;

DETAILED DESCRIPTION

Figure 1:
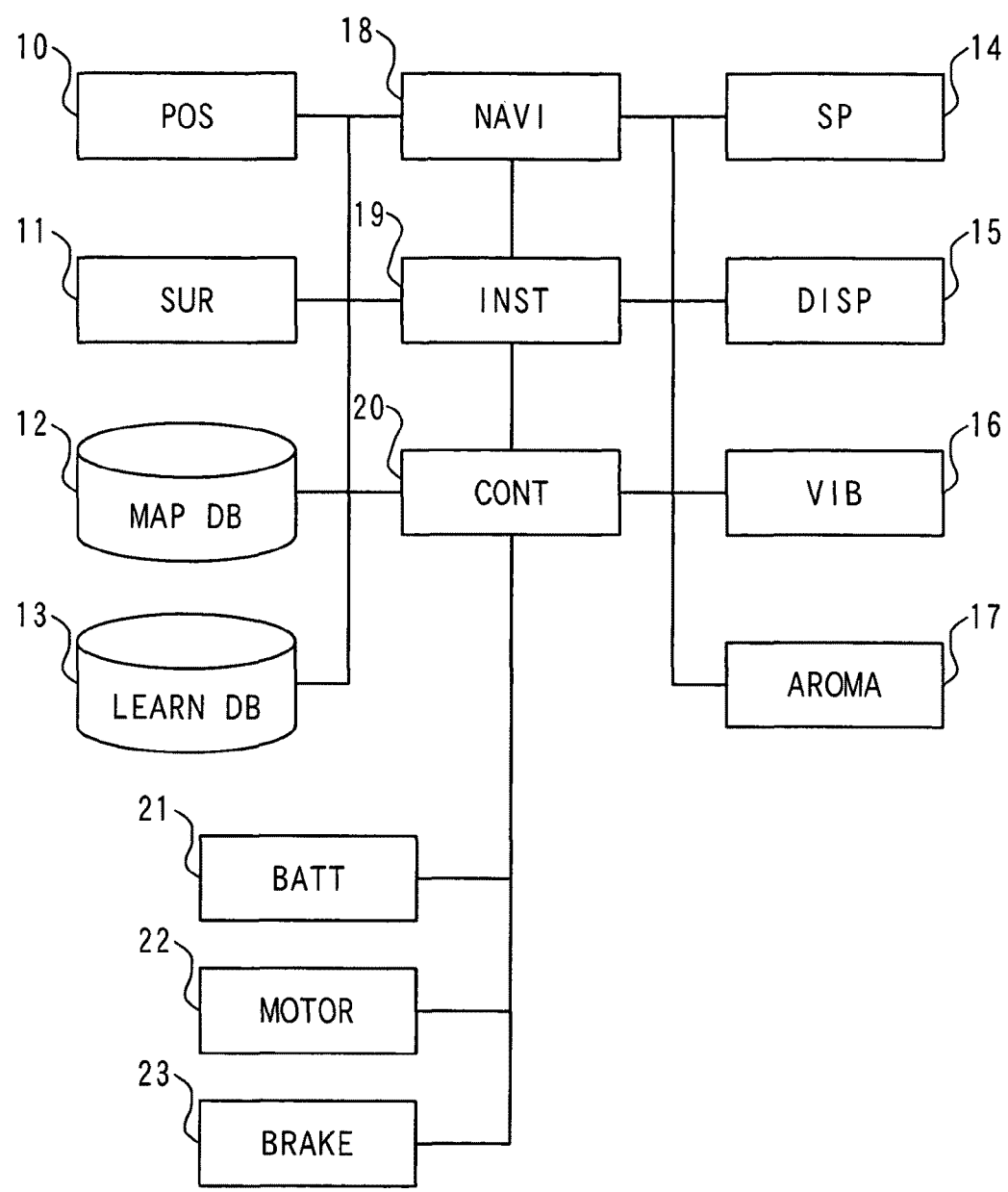
FIG. 1 is a block diagram showing the outline configuration of a re-generation brake instruction system in an embodiment of the present disclosure.

An embodiment of the present invention is explained in the following based on the drawings. FIG. 1 is a block diagram showing the outline configuration of the re-generation brake instruction system in the time of the embodiment.

The re-generation brake instruction system is a system for providing instructions for the user/driver in a vehicle that is equipped with the re-generation brake. The re-generation brake instruction system includes a position detector 10, a vehicle surrounding sensor 11, a map database 12, a learning information database 13, a voice output unit 14 (i.e., a speaker), a display unit 15, a vibration unit 16, an aroma unit 17, a navigation computer 18, a re-generation instruction computer 19, and a re-generation control computer 20 as shown in FIG. 1.

The position detector 10 includes, as its components, a GPS receiver receiving a signal from the GPS (Global Positioning System) satellites for determining the vehicle position and altitude, a gyroscope for detecting the rotational motion of the vehicle, a speed sensor for detecting the vehicle speed, together with other parts. The outputs from those components are used in the navigation computer 18 and the re-generation instruction computer 19 to calculate the position, the travel direction, speed and the like of the subject vehicle.

The vehicle surrounding sensor 11 includes, as its components, a radar sensor, a sonar sensor, an in-vehicle camera, and the like, and inputs the existing obstacle around the vehicle into the instruction computer 19 during the travel of the vehicle. Further, the vehicle surrounding sensor 11 may acquire data regarding the surrounding situation of the vehicle from a roadside device or from other vehicles through vehicle-to-vehicle communication or road-to-vehicle communication, thereby feeding the data to the re-generation instruction computer 19.

The map database 12 stores a road map consisting of a node, a link, and a network of nodes and links, respectively representing a point on the road such as an intersection and a connection between two nodes, besides inter-link relations. The database 12 further stores the drawing data for drawing maps together with other data. The learning information database 13 stores, for a certain geographical area, in a cumulative manner, the learning data of a fixed amount representing the loss of energy by the brake operation performed in that geographical area. That is, in other words, the amount of energy that could not collected by the re-generation brake is recorded in the database 12. The details of the learning data will be described in the following.

The voice output unit 14 consists of a speaker that outputs signal sounds and voice for notifying the driver/user of various information. The display unit 15 consisting of the liquid crystal display or the like is used for the display of a map image and/or the guidance image. The vibration unit 16 is a device for generating vibration. The vibration unit 16 is installed at a driver-contacting position such as an accelerator pedal, a brake pedal, a steering wheel, a driver seat or the like, for transmitting information to the driver through vibration. The vibration unit 16 uses a strong and weak vibration, or a rhythmical vibration to distinctly transmitting different types of information. The aroma unit 17 emits an aroma around the driver's face for transmitting information. The aroma unit 17 uses different aromas for transmitting different information.

The navigation computer 18 consists mainly of a well-known microcomputer having a CPU, a ROM, a RAM, an input/output and the like, for various navigation processes. The navigation processes include a map display process and a route guidance process, for example. By the map display process, the present location of the subject vehicle calculated based on a detection signal from the position detector 10 is used to read the road map data and the drawing data around the present location from the map database 12, and the map image generated therefrom is displayed on the screen of the display unit 15, together with the position mark of the subject vehicle superposed thereon. Further, when a destination is specified by the user in the route guidance process, the navigation route from the present location to the destination is searched for based on the map data in the database 12, and the searched navigation route is displayed on the display unit 15 with the map image from the drawing data. Then, voice guidance for navigation is provided at an appropriate timing. Further, the searched navigation route is input from the navigation computer 18 to the re-generation instruction computer 19.

The re-generation instruction computer 19 consists mainly of a well-known microcomputer having a CPU, a ROM, a RAM, an input/output, and the like, and performs various processes for providing the driver with information such as an energy loss situation of the re-generation brake, a brake operation advice for improving efficiency of the re-generation brake and the like. The re-generation instruction computer 19 provides the above information for the driver either at a pre-travel time, a during-travel time, or a post-travel time. The information for the driver is provided mainly from the voice output unit 14 (i.e., a speaker) and the display unit 15, and the vibration unit 16 and the aroma unit 17 may be additionally used depending on the situation. The details of the process for providing the information for the driver at the pre/during/post-travel time are mentioned later in the specification.

In addition, the re-generation instruction computer 19 stores, in a memory, the data which is sampled at a regular interval to record the vehicle position, the vehicle speed, and a transition of the brake operation conditions (e.g., the operation conditions of both of the re-generation brake and the hydraulic brake according to the brake operation by the driver), based on information input from the position detector 10 and the re-generation control computer 20.

The re-generation control computer 20 consists mainly of a well-known microcomputer having a CPU, a ROM, a RAM, an input/output and the like, and monitors and controls the operation condition of a battery 21 for driving the vehicle, a motor 22 for re-generation braking and a hydraulic brake 23 used in association with the motor 22. The re-generation control computer 20 outputs the acquired data to the re-generation instruction computer 19.

The re-generation brake system of the present disclosure assumes that there is an upper limit for the generated electricity (i.e., the (re)generated electric power) by the motor 22. Therefore, the re-generation control computer 20 only uses the re-generation brake for braking when the brake operation by the aver requests for the brake force that is within the upper limit of the generated electricity by the motor 22. When the brake operation requests for the brake force that exceeds the upper limit of the generated electricity by the motor 22, the re-generation control computer 20 controls both of the re-generation brake and, the hydraulic brake, and the hydraulic brake compensates for the insufficient portion of, the brake force not covered by the re-generation brake.

In addition, the re-generation control computer 20 acquires the brake torque of the re-generation motor 22 and the hydraulic brake 23 when those brakes are operated, and also acquires the generated power by the motor 22. The acquired data of the torque and the power is then output to the re-generation instruction computer 19.

Further, the navigation computer 18, the re-generation instruction computer 19 and the re-generation control computer 20 may be constructed as separate computers, or may be constructed as a single computer that executes different programs for different processes.

(Explanation of the Learning Data Acquisition Process)

FIG. 2 is an illustration showing an example of learning data memorized in the learning information database 13. The learning data represents the energy loss in learning sections such as SEC1, SEC2, and the like as shown in FIG. 2, by using one bit code of zero "0: No loss" and one "1: Loss" for every travel of the vehicle in the relevant section. That is, in other words, the code "1" represents that the energy is lost by the braking in a certain section, and the code "0" represents that there is no loss due to the braking in a certain section.

One learning section has eight bits of data (i.e., one byte of data) allocated for information storage. The eight bits of data arranged in an old-to-new bit represent oldest record of data by the most significant bit (i.e., the left-most bit) and the newest record of data by least significant bit (i.e., the right-most bit). The data bit is appended to as the least significant bit as the travel of the same section is repeated, and the other bits are shifted from right to left. Then, the oldest data is deleted to accommodate the newest data shifted from the right when there is no room for storing new data.

In addition, the learning data is stored by a unit of learning section, which may correspond to a point on the road (i.e., coordinates), a coordinate range, a distance range, a road section (i.e., a link or the like) beside other attributes. Further, the same road section may be considered as two different sections, if, that section has "directivity," that is, for example, the section is a slope or the like which imposes different driving characteristics for the travel of one way and for the travel of the other way.

Figure 3:
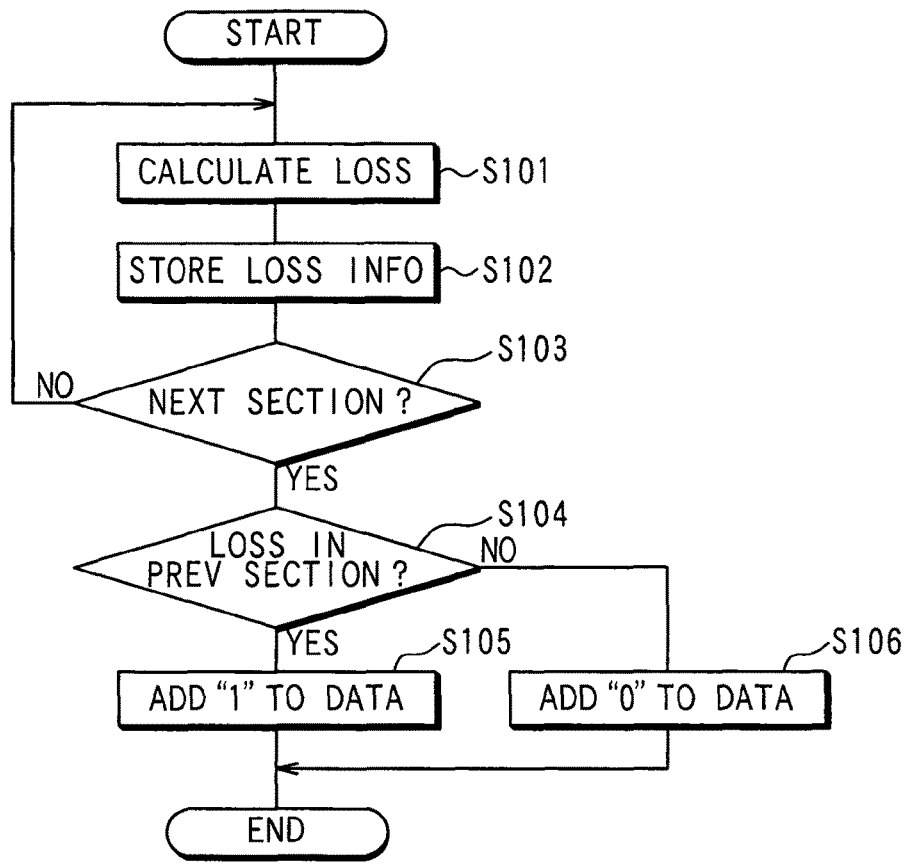
FIG. 3 is a flowchart showing a procedure of a learning process.

FIG. 3 is a flowchart showing a procedure of a learning process that the re-generation instruction computer 19 carries out to accumulate above-mentioned learning data. The present process is repeatedly carried out during the travel of the vehicle.

At first, the re-generation instruction computer 19 calculates energy loss information for a currently traveling learning section (S101). The learning section mentioned here corresponds to a unit of recording of the learning data (FIG. 2) that is to be stored in the learning information database 13. In S101, whether or not there is a loss of energy during the brake operation is calculated as the energy loss information.

The re-generation brake system in the present embodiment assumes that there is an upper limit for a momentary value of re-generatable electric energy (i.e., maximum re-generated power). Thus, the re-generated power from the motor 22 exceeding the upper limit is dissipated as heat. That is, the dissipated heat is the loss of energy not collected by the re-generation braking. Therefore, the re-generation instruction computer 19 compares the re-generated power from the motor 22 with the maximum re-generated power based on the data from the re-generation control computer 20, and determines that the energy is lost when the generated power (W) is greater than the maximum re-generated power (W). If the generated power (W) is equal to or smaller than the maximum re-generated power (W), it is determined that the energy is not lost.

In addition, the generated power may be directly calculated in the following manner based on the electric current/voltage of the output side of the motor 22, or may be calculated by the following equation 1.

$$\text{Generated power(W)} = \text{Re-generation brake torque (Nm)} \times \text{Vehicle speed(m/s)} / \text{Tire radius(m)} \quad \text{Equation 1}$$

In addition, as the value of the maximum re-generated power, a fixed value may be used according to the specification of the re-generation brake system, or a value calculated by the re-generation control computer 20 may be used according to a travel condition and a condition of the battery 21. When the fixed value is used (the former case), the fixed value may be stored in the memory for use by the re-generation instruction computer 19. When the calculated value is used (the latter case), the re-generated power value is calculated by the re-generation control computer 20 on demand based on the travel/battery condition at the moment, and the calculated value may be output to the re-generation instruction computer 19 for various arithmetic calculations.

When the hydraulic brake is operated, the braking energy consumed by the hydraulic brake is the lost energy. Therefore, the re-generation instruction computer 19 determines that the energy is lost when the hydraulic brake is operated, i.e., braking torque (Nm) of the hydraulic brake>0. On the other hand, it is determined that there is no loss of energy when the hydraulic brake is not operated, i.e., braking torque (Nm) of the hydraulic brake=0.

The loss of energy may be determined by the former method that utilizes the value of the maximum re-generated power, or by the latter method that utilizes the operation condition of the hydraulic brake, or a combination of both methods.

In S102, information regarding loss of energy calculated in S101 is stored in the memory. The energy loss information memorized here is stored temporarily after having left the currently traveling learning section, until the learning data in the learning information database 13 is updated.

Then, whether or not the vehicle enters into another learning section is determined in S103. If it is determined that the vehicle has not entered into another learning section (S103: NO), that is, if it is determined that the vehicle is still traveling in the same section, the process returns to S101, and, if it is determined that the vehicle has entered into another section (S103: YES), whether or not the energy is lost in the previous learning section is determined by referring to the energy loss information stored in the memory in S104.

When the loss of energy is determined to have occurred in the previous learning section in S104 (S104: YES), data of "1" is added to the learning data corresponding to the relevant learning section in the learning information database 13 in S105, and the learning process is concluded. If, on the other hand, the loss of energy is not determined in the previous learning section in S104 (S104: NO), data of "0" is added to the learning data corresponding to the relevant learning section in the learning information database 13 in S106, and the learning process is concluded.

(Explanation of the Pre-Travel Notification Process)

Figure 4:
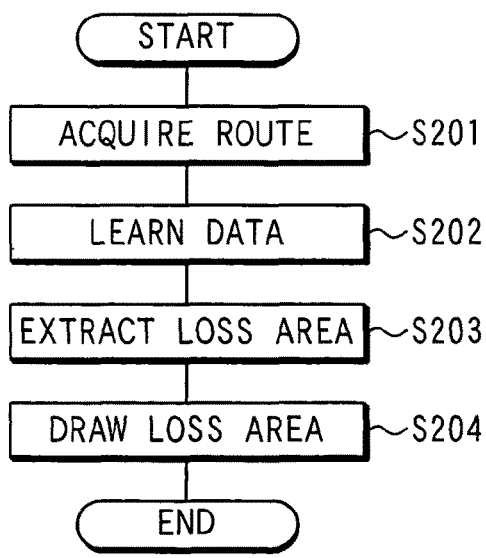
FIG. 4 is a flowchart showing a procedure of a notification process before travel.
Figure 5:
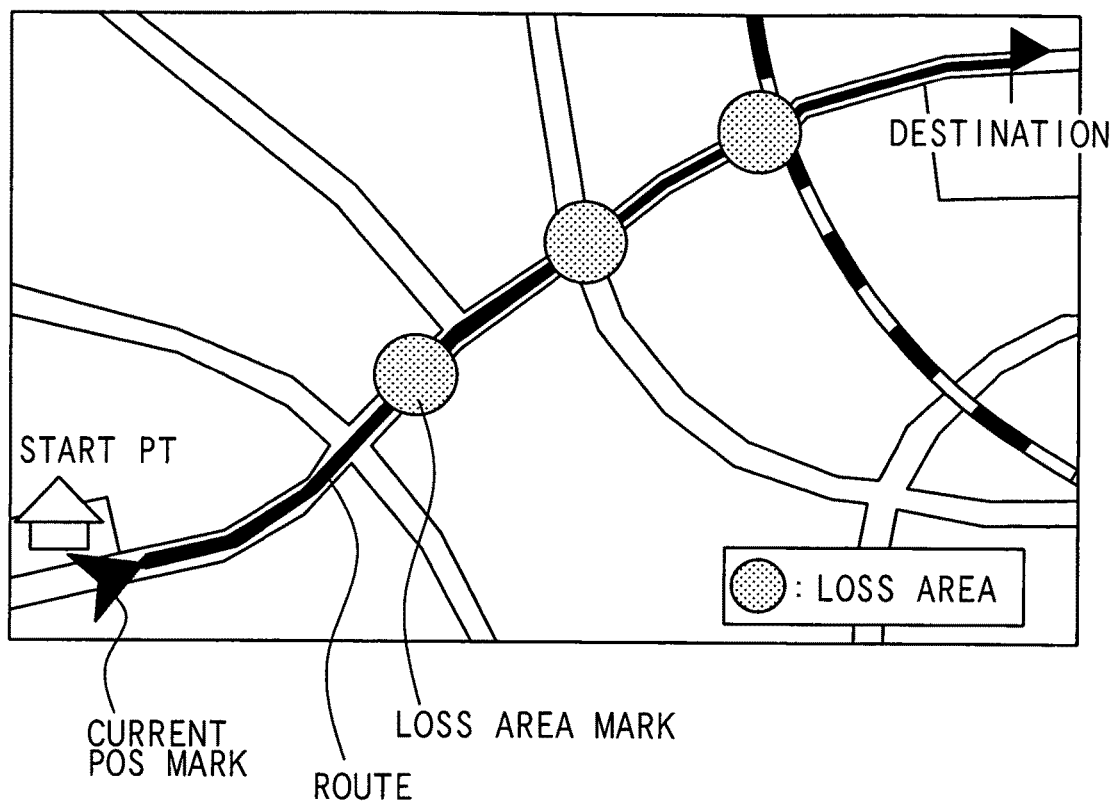
FIG. 5 is an illustration showing an example of an energy loss area displayed before a travel.

FIGS. 4 and 5 are used to explain the pre-travel notification process. In the pre-travel notification process, information is provided for the driver based on the learning data in the learning information database 13 by the re-generation instruction computer 19. FIG. 4 is a flowchart showing a procedure of the pre-travel notification process executed by the re-generation instruction computer 19 before a start of the travel. The present process is carried out during a stop time of the vehicle prior to starting a travel of the vehicle.

At first, the re-generation instruction computer 19 acquires information of an expected travel route that will be traveled by the vehicle in S201. The information acquired here is regarding the navigation route from the present location to the destination that is calculated by the navigation computer 18.

Then, the learning data of the learning sections that include the present travel route is acquired in S202 from the learning information database 13 based on the information of the travel route acquired in S201, and the learning section having a certain number of instances of energy loss (e.g., exceeding a threshold) is extracted from the data in S203. The extracted learning section may be designated as an "energy loss area" hereinafter. The learning section having five or more of the data "1" is, in this case, extracted as the "loss area." That is, the energy loss is recorded for at least five times out of eight travels in a certain learning section means that that learning section is determined as the energy loss area.

Then, a mark representing the location of the extracted energy loss area is displayed on the map image that is drawn by the navigation computer 18 in S204, before concluding the pre-travel notification process. In that case, if the learning data is recorded for a small unit area such as a point (i.e., coordinates) or the like, only the representative point(s) on the route may have the energy loss area mark in S204.

FIG. 5 is an illustration of an example of energy loss areas displayed on the display unit 15 by the pre-travel notification process mentioned above. As shown in FIG. 5, the map image has the travel routes from the present location (i.e., a start point) to the destination, and the marks representing the positions of the energy loss areas based on the learning results of loss of energy due to the brake operation in the past travels are superposed on the map image.

(Explanation of the During-Travel Notification Process)

Figure 6:
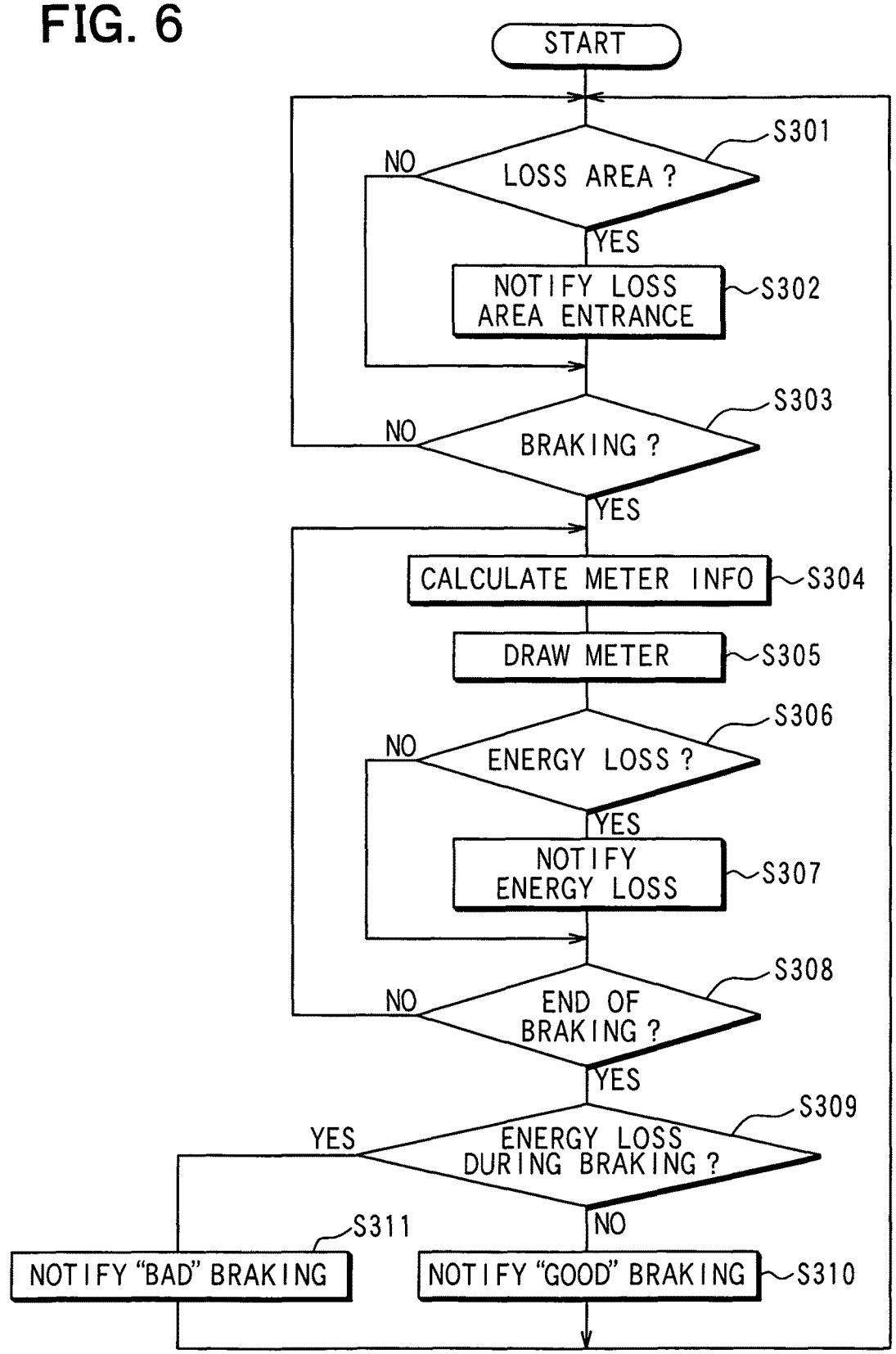
FIG. 6 is a flowchart showing a procedure of the notification process during the travel.
Figure 7:
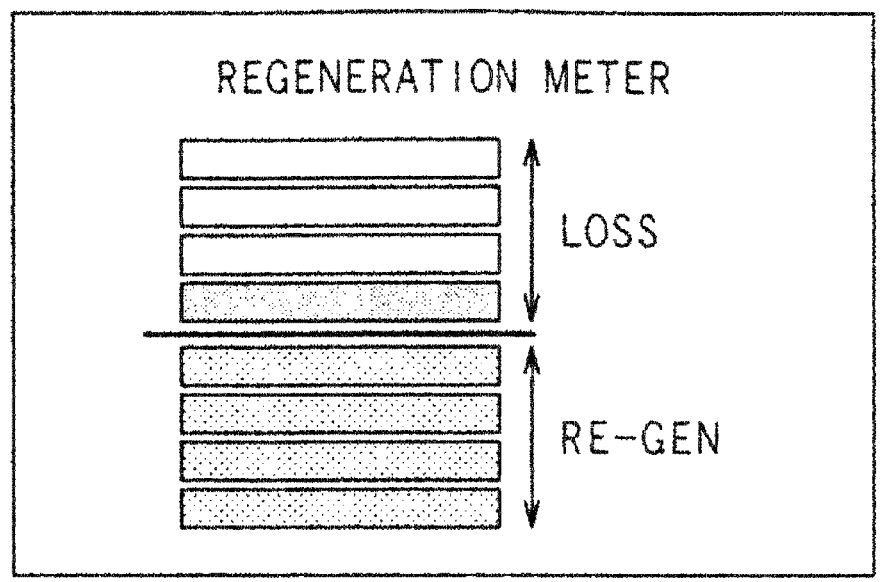
FIG. 7 is an illustration showing an example of a re-generation meter.
Figure 8:
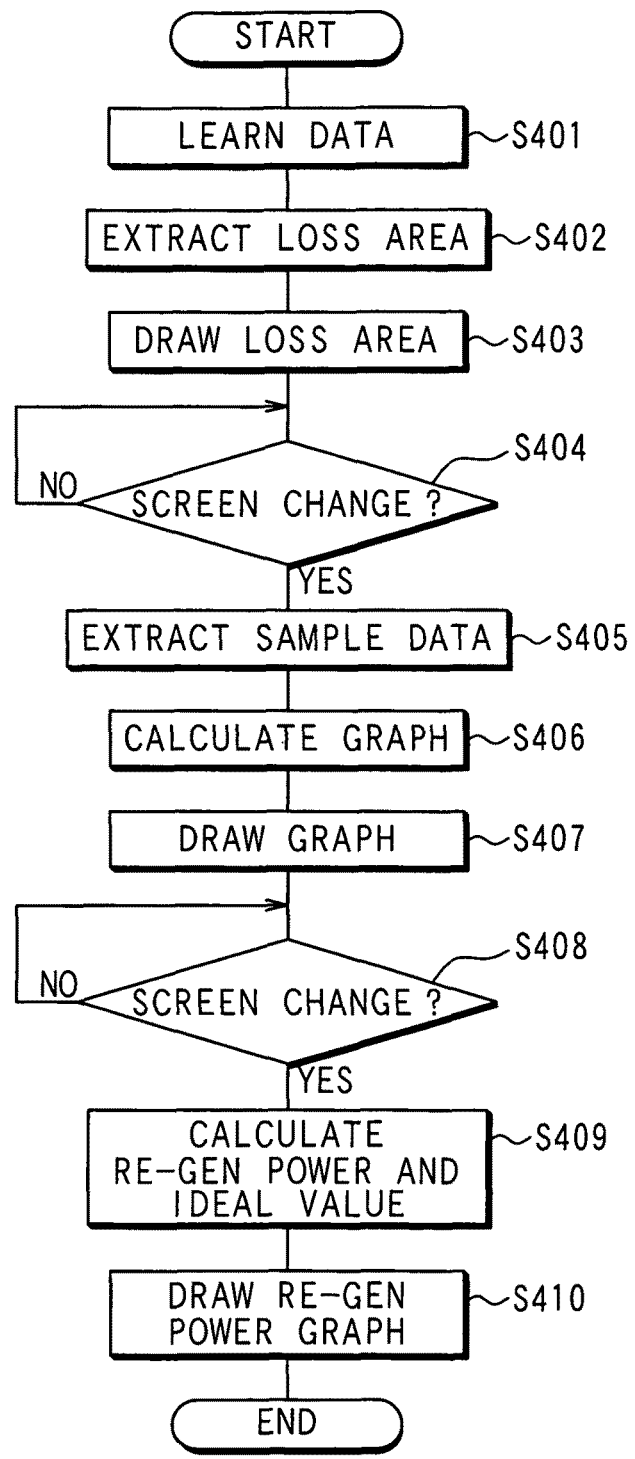
FIG. 8 is a flowchart showing a procedure of the notification process after a travel.

FIGS. 6 and 7 are used to explain the during-travel notification process. The during-travel notification process, provides the driver of the information regarding the current condition of energy loss. FIG. 6 a flowchart showing a procedure of the during-travel notification process that is executed by the re-generation instruction computer 19. The present process is repeatedly carried out during the travel of the vehicle, that is, after the start of the travel until the end of the travel.

At first, the re-generation instruction computer 19 determines whether or not the vehicle enters into the energy loss area based on a detection signal from the position detector 10 and the learning data in the learning information database 13 in S301 (see FIG. 2). If there are five or more data of "1" in the learning data, the learning section is determined as the energy loss area. When it is determined that the vehicle has not entered into the energy loss area (S301: NO), the process proceeds to S303. On the other hand, when it is determined that the vehicle has entered into the energy loss area (S301: YES), entrance into the energy loss area is notified for the driver by voice in S302, and the process proceeds to S303.

Then, in S303, whether or not the brake operation by the driver is performed is determined. When it is determined that the brake operation has not been performed (S303: NO), the process returns to S301. On the other hand, when it is determined that the brake operation is performed (S303: YES), information for displaying a re-generation meter is calculated in S304. The re-generation meter is used to display an energy collection condition and an energy loss condition based on the operation condition of the re-generation brake and the hydraulic brake. Then, based on the information calculated in S304, the re-generation meter as shown in FIG. 7 is displayed on the display unit 15 in S305.

The details of the display method of the re-generation meter in S304 and S305 are explained. FIG. 7 is an illustration showing an example of the re-generation meter. As shown in FIG. 7, eight elements are drawn in the re-generation meter, and the energy collection/loss condition is notified for the driver by the number of lighted elements. More practically, the element of the re-generation meter is lighted from the bottom one toward the top in accordance with the amount of the braking power of all brakes that are operated according to the brake operation of the driver. In FIG. 7, the five elements from the bottom are in the lighted condition.

When the four elements or fewer are lighted, that proportionally indicates a condition that the re-generation brake is bearing the brake force within the upper limit of the re-generated power. That is, in other words, the loss of energy is not caused when the number of the lighted elements in the re-generated meter is up to four from the bottom. If five or more elements from the bottom are lighted, the fifth elements and the above proportionally indicate that the braking power of all brakes exceeds the upper limit of the re-generated power of the re-generation brake. That is, in other words, when the fifth and above elements is/are lighted, the situation is that the generated power of the motor 22 is exceeding the maximum re-generated power and the hydraulic brake is operated, thereby indicating the energy loss.

The number of the lighted elements in the re-generation meter is determined based on the meter level calculated by the equations 2 and 3.

Meter level=Total brake power(W)/(Maximum re-generation power(W)/4)  Equation 2

Total brake power(W)=Total brake torque(Nm)×Vehicle speed(m/s)/Tire radius(m)  Equation 3

The meter level calculated in the equation 2 is rounded off, and the rounded-off value is used to determine the number of lighted elements in the re-generation meter as shown in the table 1 in the following.

TABLE 1

| Meter level | Lighted element(s) |
|---|---|
| Below 0 | No element |
| 1 to 4 | Re-generation element 1 to 4 |
| 5 to 8 | Re-generation element 1 to 4 plus Loss element 1 to 4 |
| Above 8 | All elements |

Then, whether or not the energy loss is currently happening is determined in S306. In this case, the energy loss may be determined by the method used in the learning data acquisition process (see FIG. 3), or the energy loss may be determined when the meter level is five or more based on the calculation results in S304.

When it is determined that the loss of energy is not currently happening (S306: NO), the process proceeds to S308. On the other hand, a voice or a signal sound is output when it is determined that the loss of energy is currently happening (S306: YES) to notify the loss for the driver in S307. For the notification of the loss of energy for the driver, the vibration unit 16 may be used to transmit a vibration pattern specific to the energy loss notification, or the aroma unit 17 may be used to emit an aroma that is specific for notifying that the energy loss is currently happening for the driver.

Then, whether a series of brake operations is concluded is determined in S308. In this case, the moment when the braking torque of sampled braking changes from a positive value to 0 is determined as an end of the brake operation. When it is determined that the brake operation is continuing (S308: NO), the process returns to S304. Thereafter, by repeating the process of S304 to S308 during the continuation of braking, the notification of information regarding the energy loss during braking is continued. Then, whether there is the energy loss during the brake operation is determined in S309 when it is determined that the brake operation has ended in S308 (S308: YES). In this case, when the meter level is equal to or less than four during the brake operation, it is determined that there is no energy loss. If the meter level is equal to or more than five during the brake operation, it is determined that the energy is lost.

When it is determined that no loss of energy has happened during the brake operation in S309 (S309: NO), a notification sound/voice that notifies a determination result that the brake operation is good is output in S310, and the process returns to S301. On the other hand, when it is determined that loss of energy has happened during the brake operation in S309 (S309: YES), a notification sound/voice that notifies a determination result that the brake operation is no good (i.e., "bad") is output in S311, and the process returns to S301. In this case, the vibration unit 16 may alternatively be used for the notification of the determination result, or the aroma unit 17 may be used for the notification of the determination result for the driver. In addition, a notification symbol may be displayed on the display unit 15 for notifying the driver of the determination result.

The during-travel notification process may have the following modifications.

(1)

When entrance into the energy loss area is notified for the driver in S302, the notification timing may be changed according to the speed of the vehicle. For example, when the vehicle speed is traveling in high speed, the entrance into the energy loss area may be notified for the driver at a vehicle position prior to the entrance into the energy loss area. In this manner, a sufficient time can be reserved for the driver for efficiently reducing the vehicle speed by the earlier brake operation that only uses the re-generation braking. If the vehicle speed is low, the notification timing of entrance into the energy loss area may be delayed to a timing after the entrance into the energy loss area, because the driver has sufficient time for the re-generation braking even after the belated entrance notification.

(2)

In S306 and S307, the energy loss is notified only when the energy loss is happening during the brake operation. Instead, when the energy loss is not happening during braking (S306: NO), the determination result that the brake operation is good may be notified, or, when the energy loss is happening during braking (S306: YES), the determination result that the brake operation is no good may be notified.

(3)

When the information is notified for the driver during the travel of the vehicle in S302, S305, S307, S310, or S311, the information notification may be restricted depending on the situation around the vehicle. More practically, if the subject vehicle and an obstacle around the vehicle are determined to be close to each other based on an input signal from the vehicle surrounding sensor 11, the information notification may be cancelled or suppressed. In this manner, it is preferable that the driver's attention is not distracted from the obstacle around the vehicle.

(Explanation of the After-Travel Notification Process)

FIGS. 8 to 11 are used to explain the after-travel notification process. In the after-travel notification process, the information regarding the energy loss during the travel is provided for the driver from the re-generation instruction computer 19. This process is performed during a vehicle stop time after the travel.

At first, the re-generation instruction computer 19 acquires the learning data of the learning section that has the travel route from the learning information database 13 (see FIG. 2) based on the information of actually traveled route of the vehicle in S401. Then, from the acquired learning data, the energy loss areas having the certain number of instances of energy loss are extracted in S402. In this case, the learning section having five or more pieces of data "1" in the learning data is extracted. In other words, the learning section having at least five out of eight travels in the past in association with the energy loss is identified as the energy loss area.

Then, the energy loss mark indicating the location of the energy loss area is superposed on the map image that is controlled to be displayed on the display unit 15 under control of the navigation computer 18 in S403.

Figure 9:
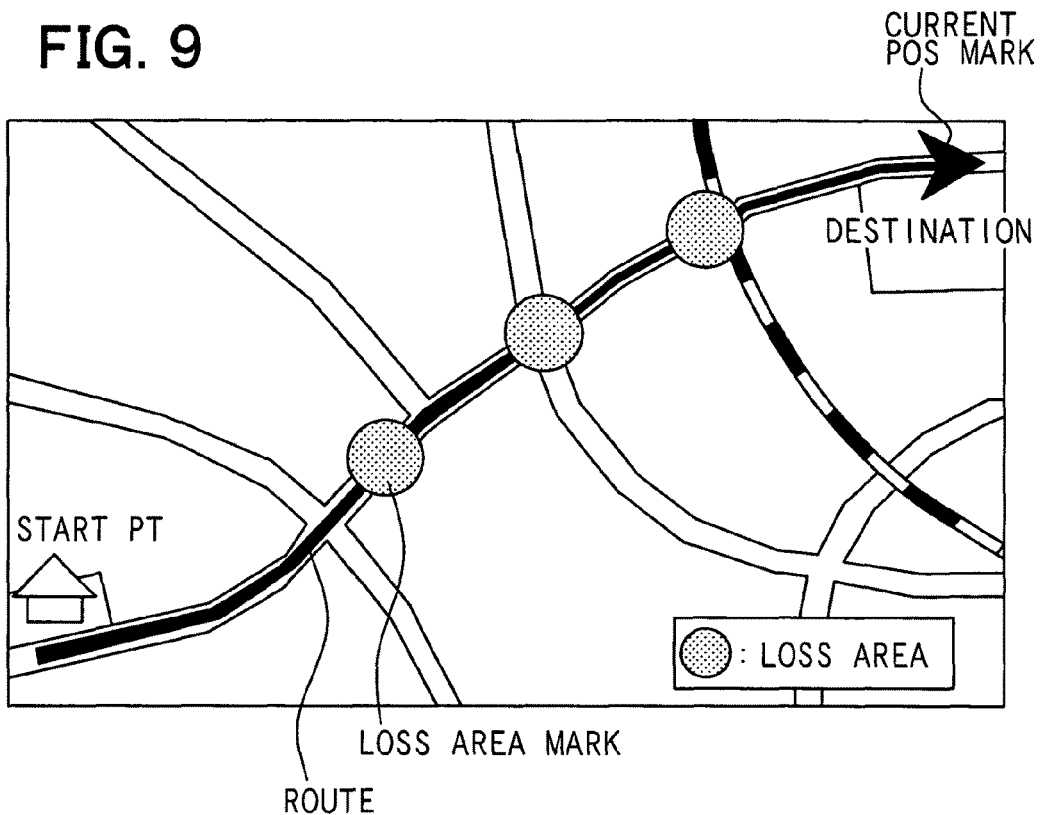
FIG. 9 is an illustration showing an, example of an energy loss area displayed after a travel.

FIG. 9 is an illustration showing an example of the energy loss area displayed on the display unit 15 after the travel in S403. On the map image, the actual travel route from the start point to the present location (i.e., a destination) is displayed as shown in FIG. 9, and positions of the energy loss areas are indicated by the marks on the map image, based on the learning results of energy loss conditions due to the brake operation in the actual travel.

Then, in S404 of the flowchart, whether or not the user inputs a screen change instruction is determined. In this case, the same step is repeated until the user inputs the screen change instruction (S404: NO). Then, upon having the screen change instruction (S404: YES), sample data is extracted from the data recorded during the travel, for the purpose of displaying one instance of the brake operation in a brake operation condition graph in S405. In this case, the brake operation causing the highest energy loss is extracted as the sample. More practically, from among the sampled brake operations, the brake operation having the highest determination value calculated by the following equation 4 is selected.

Determination value=Brake operation time(s)×Maximum brake power(W)　　Equation 4

Based on the sample data of brake operation extracted in S405, a graph showing the transition of brake power of the sampled brake operation and a graph showing the transition of brake power of an ideal brake operation that yields the same speed reduction as the sampled brake operation are both calculated in S406. In this case, the graph of the sampled brake operation is approximately calculated by a function in the following equation 5, and the graph of the ideal brake operation is approximately calculated by a function in the following equation 6. The variable x in the equations 5 and 6 represents time (s), and the variable y in those equations represents the brake power (W).

(Graph Drawing Function for the Sampled Brake Operation)

$$y = -\{\text{max\_regen}/(\text{brake\_time}/2)^2\} \times \{x - (\text{ideal\_brake\_time} - (\text{brake\_time}/2))\} + \text{max\_regen} \quad \text{Equation 5}$$

(Graph Drawing Function for the Ideal Brake Operation)

$$y = -\{\text{ideal\_regen}/(\text{ideal\_brake\_time}/2)^2\} \times \{x - (\text{ideal\_brake\_time}/2)\} + \text{ideal\_regen} \quad \text{Equation 6}$$

In addition, a definition of the constant used in the equations 5 and 6 is given in the following table 2.

TABLE 2

| Constant | Meaning |
| --- | --- |
| max_regen | Maximum value of brake power of the relevant brake operation |
| brake_time | Brake operation time of the relevant brake |
| ideal_regen | Maximum re-generated power |
| ideal_brake_time | Ideal brake operation time without energy loss = max_regen × brake_time/ideal_regen |

Then, based on the calculation of the graph of the sampled brake operation and the graph of the ideal brake operation in S406, a brake graph window (see FIG. 10) is drawn, and the both graphs are displayed on the display unit 15 in S407. In this case, the graph has the horizontal axis (i.e., x axis) of time (s) and the vertical axis (i.e., y axis) of brake power (W). The range of the horizontal axis extends from 0 to one of the sampled brake operation time (i.e., brake_time) and the ideal brake operation time (i.e., ideal_brake_time) (i.e., whichever of greater value). The range of the vertical axis extends from 0 to one of the maximum value of the sampled brake power (i.e., max_regen) and the maximum re-generated power (i.e., ideal_regen) (i.e., whichever of the greater value).

Further, in the brake graph window, a brake operation time of the sampled brake operation (i.e., brake_time) and a brake operation time of the ideal brake operation (i.e., ideal_brake_time) are displayed. In addition, an advisory message for the driver regarding the brake operation is displayed in the window. The message may be selectively shown from among the prepared messages, for example, according to a brake force comparison between the maximum value of the sample brake power and the maximum re-generated power, a brake operation time comparison between the sampled and ideal braking or the like.

Figure 10:
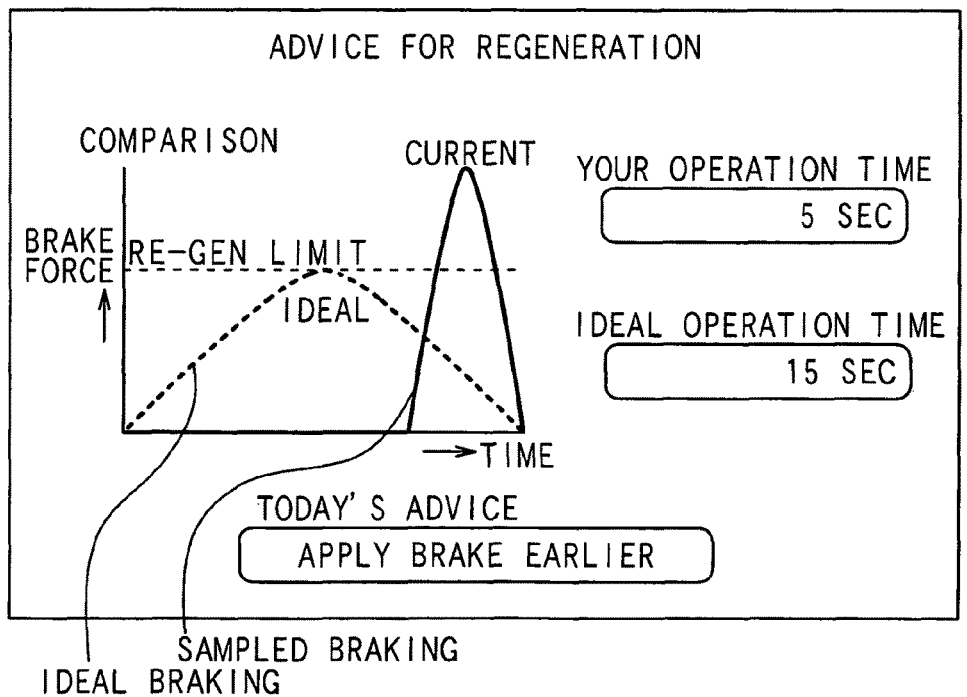
FIG. 10 is an illustration showing an example of a brake graph window.

FIG. 10 is an illustration showing an example of a brake graph window. As shown in FIG. 10, the brake graph window shows both of the sampled braking and the ideal braking in a comparable manner. In the graph, the end time of the sampled braking and the end time of the ideal braking are positioned at the same spot. In this manner, whether the brake operation of the driver has started earlier or later than the ideal braking can be easily recognized by the driver. Further, the graph having a re-generated power limit line enables the driver to recognize how much energy is lost in the braking.

In addition, on the left side of the brake graph window, "YOUR OPERATION TIME" is displayed as "brake_time," together with "IDEAL OPERATION TIME" based on "ideal_brake_time." Further, "TODAY'S ADVICE" at the bottom of the brake graph window shows an advice for the sampled braking "APPLY BRAKE EARLIER," which is based on the fact that the sampled brake operation time is shorter than the ideal brake operation time.

Then, in S408, whether the user inputs the screen change instruction or not is determined. While the user does not input the screen change instruction (S408: NO), the same step is repeated. When the screen change instruction is input (S408: YES), the actually collected re-generated power and the ideal re-generated power are calculated for each section based on the sampled data of the actual braking during the travel in S409. In this case, the ideal re-generated power means that the energy from speed reduction due to the braking is collected entirely as the electric energy. Further, the unit of section where the re-generated energy is counted may be a section of certain distance, a section of certain travel time, a road section (i.e., a link) in the map data, or the like.

The actual re-generated power and the ideal re-generated power are calculated by the following equations 7, 8, 9. The Σ mark in the equations 8, 9 means a calculation of sum of the samples in the relevant section.

<Actually Collected Re-Generated Energy>

Sampled value of all brake powers(W)=Sampled torque of all brakes(Nm)×Sampled vehicle speed(m/s)/Tire radius(m)　　Equation 7

Re-generated power amount(kws)=Σ(Sampled value of re-generated power(W)×Sample interval(s))/1000　　Equation 8

In equation 8, the sampled value of re-generated power is a value derived from the equation 7. That is, the sampled value of all brake powers derived from the equation 7 is converted according to the following table 3 to have the sampled value of re-generated power in equation 8.

TABLE 3

| Brake power calculation | Sampled value of re-generated power |
| --- | --- |
| Below 0 | Re-generated power = 0 |
| Between 0 and Max re-generated power | Re-generated power = Brake power calculation result |
| Above Max re-generated power | Re-generated power = Max re-generated power |

<Ideal Re-Generated Power Amount>

Ideal re-generated power amount(kws)=Σ(Sampled value of all brake powers(W)×Sample interval(s))/1000　　Equation 9

Then, in S409, the re-generated power graph window (FIG. 11) is drawn and displayed on the display unit 15 in S410, based on the actually collected re-generated power and the ideal re-generated power for each section calculated in S409. The re-generated-power graph in the window has a vertical axis of re-generated power (W) and the horizontal axis of recorded sections. The horizontal axis extends from the start of travel to the end of the travel (i.e., all sections in the travel). Further, the window includes the brake operation advice for the driver. The advice may be given as a message selected from prepared message candidates.

Figure 11:
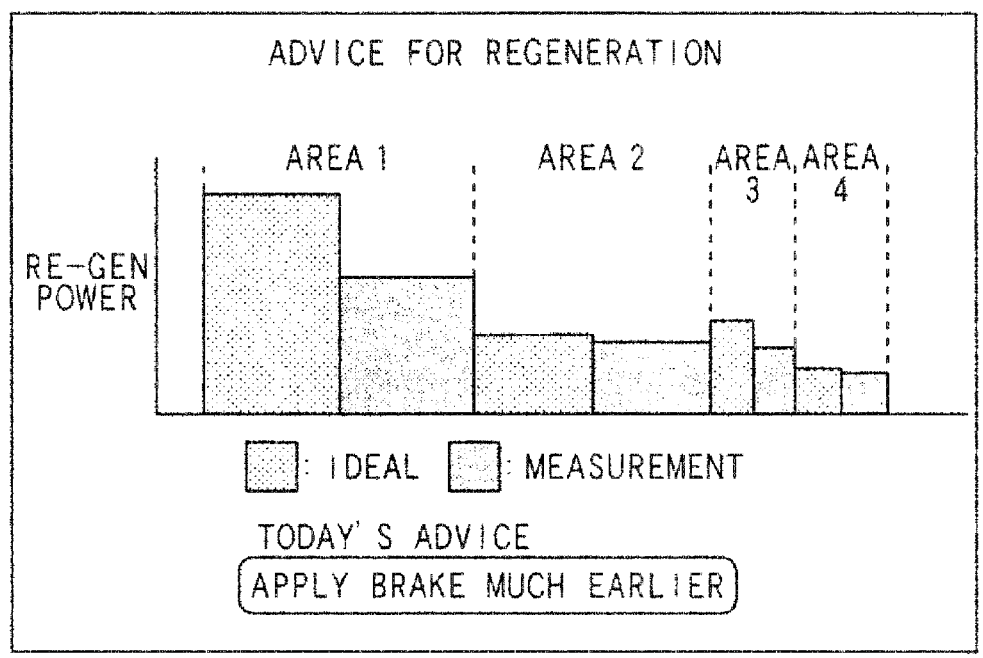
FIG. 11 is an illustration showing an example of re-generated power graph window.

FIG. 11 is an illustration showing an example of the re-generated power graph window. The graph shows, for each section of AREA 1, 2, etc., the ideal re-generated power (i.e., an ideal value) and the actual re-generated power (i.e., an actual measurement) side by side. In this manner, how much energy is lost due to the brake operation of the driver in each section can be easily recognized.

In addition, the bottom line of the window shows an advice for the brake operation such as "APPLY BRAKE MUCH EARLIER" or the like. This message reflects the situation that the actually collected energy is smaller than the ideal re-generated energy.

The correspondence between the wording and the claim terms may be defined in the following manner. That is, the re-generation instruction computer 19 and the re-generation control computer 20 is equivalent to a loss calculation unit. The re-generation instruction computer 19 is equivalent to a control unit, a loss recorder, a brake information record unit, a regeneration power calculation unit, and a total braking energy calculation unit. The position detector 10 is equivalent to a position detector. The learning information database 13 is equivalent to an information storage. The navigation computer 18 is equivalent to a travel locus acquisition unit. The vehicle surrounding sensor 11 is equivalent to a field condition acquisition unit.

(Advantageous Effects)

According to the re-generation brake instruction system, advantageous effects in the following are expected.

The energy loss conditions for each of the traveled areas is stored and accumulated statistically as learning data, and the energy loss area information is notified based on the stored information. Therefore, the driver of the vehicle recognizes in what area his/her drive has been susceptible to the loss of energy. Therefore, the driver is instructed and reminded to apply an efficient brake when he/she travels in that area. Further, the driver's confidence that, except for the energy loss area, his/her driving operations are appropriate/efficient in terms of energy collection by the re-generation braking is proved.

Further, the expected travel route may be considered prior to starting the travel, for the display of the energy loss area. Therefore, the driver can recognize in advance what part of the expected travel route is susceptible to the energy loss. As a result, the driver is reminded of an efficient braking required portion of the expected travel route prior to the travel. In addition, only the required area is displayed for reminding the driver, thereby preventing the driver to be distracted by the display of useless information.

Furthermore, an approach/entrance to the energy loss area is notified for the driver during the travel. Therefore, the driver is reminded of the travel of the energy loss area in a timely manner. As a result, the driver's energy efficient brake operation for maximizing the re-generation is facilitated in a timely manner.

Furthermore, the energy loss area in the traveled route is displayed on the screen after the travel. Therefore, the actual travel by the driver can be reviewed just after the travel for recognition and self-examination of the energy efficiency. As a result, the efficient driving by the driver in the subsequent travels is facilitated.

Furthermore, a feedback for the driver is provided while the driver is actually operating the brake. Therefore, the driver can directly "feel" that his/her brake operation is efficient or not (i.e., good or bad), thereby leading to the learning experience of how much braking is appropriate for re-generation of electricity without energy loss. That is, the brake operation feedback serves as an on-the-spot training session for the driver for the improvement of the braking/driving skill.

Furthermore, the driver receives the evaluation of his/her braking just after the travel based on the energy loss during the braking. Therefore, the driver can easily understand the evaluation of the brake operation just performed.

Furthermore, the brake operation actually performed and the ideal brake operation are visually represented and compared in a graph form based on the sampled data. Therefore, the brake operation by the driver is easily recognized by the driver, which serves as an effective and concrete advice for the driver.

Furthermore, the actually collected energy and the ideal re-generated energy are compared in a graph form, thereby facilitating the understanding of how much energy saving has been achieved. As a result, the motivation for the efficient driving by utilizing the re-generation brake is improved.

Modification Examples

Although the present disclosure has been fully described in connection with preferred embodiment thereof with reference to the accompanying drawings, it is to be noted that various changes and modifications will become apparent to those skilled in the art.

In the above embodiment, the learning data is recorded in the learning information database 13 in each of the learning sections, by detecting whether the energy loss has happened for every travel in those sections. However, the energy loss may be recorded in a different manner, such as counting how many instances of energy loss is happening in a specific single learning section.

The energy loss may also be recorded as the total loss of energy (i.e., the total amount of lost electricity power) in the learning section in association with the learning section for each of the travels, based on the sampled data of brake operation.

Furthermore, the number of the energy loss learned in the past travels and the number of the energy loss newly happening in the current travel may be averaged for the record of the energy loss. Alternatively, the energy loss amount learned in the past and the new energy loss amount may be averaged for recording. The average may be calculated as the moving average. Alternatively, calculation parameters for the calculation of energy loss amount such as a hydraulic brake torque or the like may be averaged or may be calculated as the moving average.

Such changes, modifications, and summarized schemes are to be understood as being within the scope of the present disclosure as defined by appended claims.

What is claimed is:

1. A notification apparatus having a regeneration brake system that uses electricity generation load of a motor as a braking force to a tire of a vehicle, and collects regenerated electric energy to a vehicle battery, the apparatus comprising:

a notification unit notifying a driver of information;

a loss calculation unit calculating loss information regarding energy loss that is defined as difference between a decrease of kinetic energy due to braking by the driver and regeneration by the regeneration brake in the course of braking;

a control unit generating energy information regarding the energy loss and controlling notification of the energy information for the driver by the notification unit based on the loss information calculated by the loss calculation unit;

a position detector detecting a current position of the vehicle;

an information storage storing the loss information of the energy loss during travel of the vehicle in a plurality of geographical areas in a statistical manner; and a loss recorder statistically recording, in the information storage, the loss information calculated by the loss calculation unit in association with each of the plurality of geographical areas in which the energy loss is created based on the position of the vehicle detected by the position detector, wherein the control unit calculates frequency information about a frequency of the energy loss in each of the plurality of geographical areas based on the information recorded in the information storage, and the control unit notifies the drive of an entrance of the vehicle into an energy loss geographical area that has an above-threshold frequency of the energy loss, at the time of entrance of the vehicle into the energy loss geographical area, based on the information stored in the information storage and the route information acquired by the route acquisition unit.

2. The notification apparatus of claim 1 further comprising:
a route acquisition unit acquiring route information about a route that is expected to be traveled by the vehicle, wherein the control unit generates information and notifies the driver of the information, the information about the frequency of creation of the energy loss in geographical area that contains the route that is expected to be traveled by the vehicle, based on the information stored in the information storage and the route information acquired by the route acquisition unit.

3. The notification apparatus of claim 1, wherein
the control unit changes a notification timing of entrance notification that notifies the entrance of the vehicle into the energy loss geographical area of the above-threshold frequency of the energy loss creation, according to a speed of the vehicle.

4. The notification apparatus of claim 1 further comprising:
a travel locus acquisition unit acquiring travel information on an actually-traveled route of the vehicle, wherein the control unit generates information on the energy loss creation in a geographical area that corresponds to the actually-traveled route of the vehicle during a period between a start of travel and an end of travel of the vehicle, based on the information stored in the information storage and the route information acquired by the route acquisition unit, and the control unit notifies the driver of the generated information.

5. The notification apparatus of claim 1, wherein
the control unit notifies the driver of information regarding whether or not the energy loss is created at a current moment or regarding the frequency of the energy loss while the driver is operating the brake, based on the loss information calculated by the loss calculation unit.

6. The notification apparatus of claim 1, wherein
the control unit notifies the driver of information regarding braking skill evaluation for the current frequency of the energy loss while the driver is operating the brake, based on the loss information calculated by the loss calculation unit.

7. The notification apparatus of claim 1, wherein
the control unit notifies the driver of information regarding braking skill evaluation for the frequency of the energy loss due to a braking after the braking of the driver, based on the loss information calculated by the loss calculation unit.

8. The notification apparatus of claim 1 further comprising:
a field condition acquisition unit acquiring field condition information regarding an obstacle around the vehicle, wherein the control unit refrains from notifying the loss information during the travel of the vehicle, if the traveling vehicle is determined to be in a closely-located condition based on the field condition information acquired by the field condition acquisition unit.

9. The notification apparatus of claim 1 further comprising:
a brake information record unit recording information regarding time transition of brake power during braking by the brake operation of the driver, wherein the control unit calculates, after the travel of the vehicle, time transition information of braking by the driver based on the information recorded by the brake information record unit during a period between a start of travel and an end of travel of the vehicle, and the control unit notifies the driver of the calculated time transition information.

10. The notification apparatus of claim 9, wherein
the control unit notifies the driver of information on time transition of actual braking by the driver and information on time transition of ideal braking in a relevant situation in an easily comparable manner after a travel of the vehicle, by calculating information on time transition of the ideal braking that achieves an equivalent effect of the actual braking through control of braking power being limited within a maximum regeneration electric power, based on the information recorded by the brake information record unit during the travel and a period between a start of travel and an end of travel of the vehicle and the maximum regeneration electric power by the regeneration brake system.

11. The notification apparatus of claim 1 further comprising:
a regeneration power calculation unit calculating an amount of regenerated electric power from the regeneration brake system between a start of travel and an end of travel of the vehicle, wherein the control unit notifies the driver of information on the amount of regenerated electric power during the travel of the vehicle after the travel of the vehicle.

12. The notification apparatus of claim 11 further comprising:
a total braking energy calculation unit calculating a total amount of braking energy by braking operation of the driver between a start of travel and an end of travel of the vehicle, wherein the control unit notifies the driver of the amount of regenerated electric power calculated by the regeneration power calculation unit during the travel of the vehicle and the total amount of braking energy calculated by the total braking energy calculation unit during the travel of the vehicle after the travel of the vehicle in an easily-comparable manner.

13. The notification apparatus of claim 11, wherein
the regeneration power calculation unit calculates the amount of regenerated electric power for each of divisions of the travel of the vehicle, and
the control unit notifies the driver of information on the amount of regenerated electric power regarding each of the divisions of the travel of the vehicle.

14. The notification apparatus of claim 12, wherein
the regeneration power calculation unit and the total braking energy calculation unit respectively calculate the amount of regenerated electric power and the total amount of the braking energy for each of the divisions of the travel of the vehicle, and
the control unit notifies the driver of the amount of the regenerated electric power and the total amount of braking energy for each of the divisions of the travel of the vehicle in an easily-comparable manner.

15. The notification apparatus of claim 1, wherein
the control unit notifies the driver of the information in a manner that can be perceptive through at least one of visual, auditory, tactile and olfactory sensations of the driver through the notification unit.

* * * * *